INVENTOR.
ROBERT W. DRUSHEL

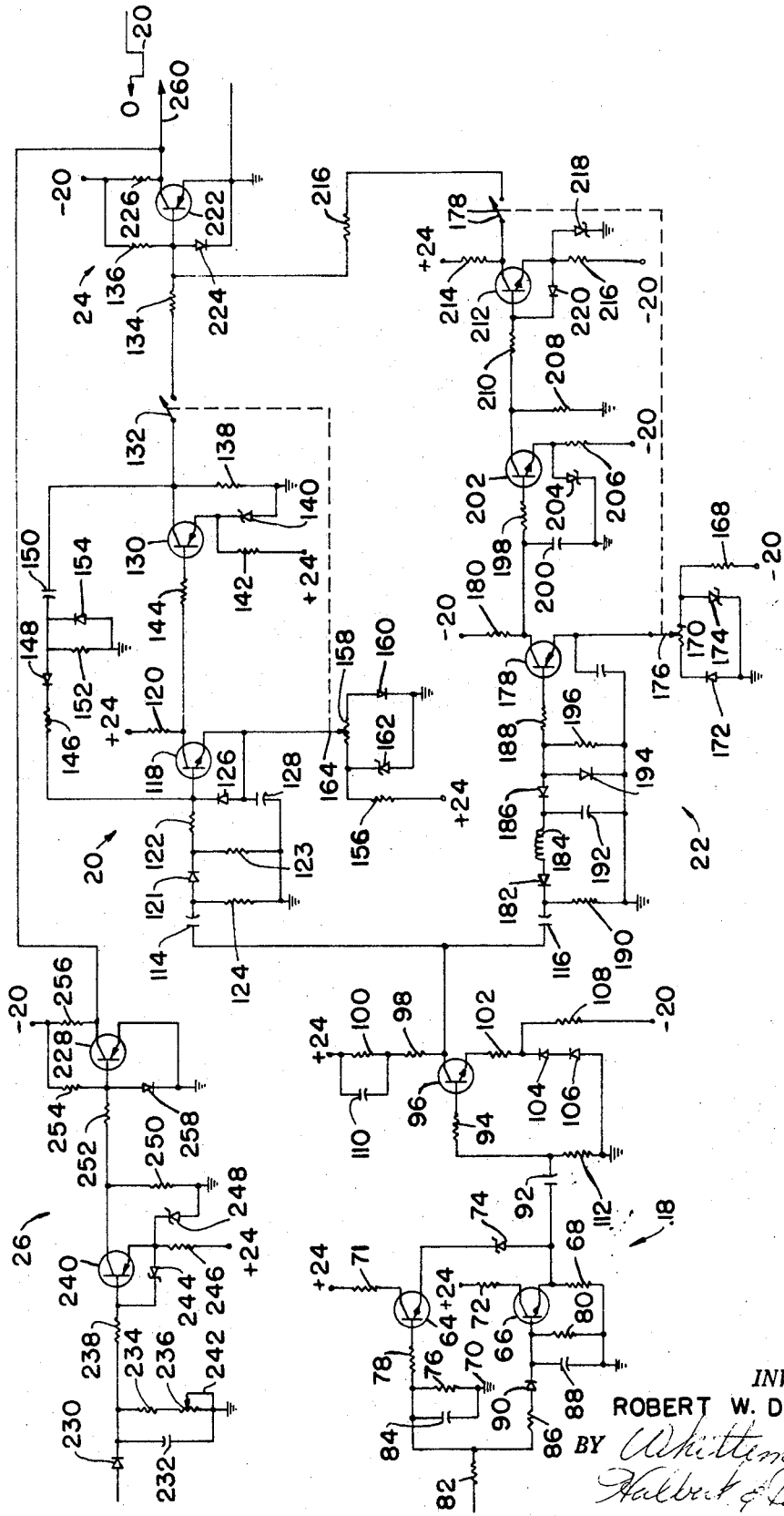

United States Patent Office 3,521,083
Patented July 21, 1970

3,521,083
ELECTRONIC CONTROL CIRCUIT
Robert W. Drushel, Farmington, Mich., assignor to Ex-Cell-O Corporation, Detroit, Mich., a corporation of Michigan
Filed Oct. 10, 1966, Ser. No. 585,395
Int. Cl. H03k 5/20, 17/00
U.S. Cl. 307—231
11 Claims

ABSTRACT OF THE DISCLOSURE

A circuit for and method of providing an output control signal in response to a positive or negative current change signal having a selected magnitude in which a composite electric signal including current change signals and extraneous signals is compressed and the current change signals isolated therefrom in a unique emitter follower circuit. Separate circuits are provided responsive to positive and negative current change signals for providing output signals only when the current change signals are above a predetermined selectable minimum. A gate circuit is provided for suppressing any output signal for an initial selected period while the composite electric signal is initially brought to an operating level.

---

This invention relates to electronic control circuits and refers more specifically to a circuit for detecting rising and falling current signals in an electric circuit to which it is connected and providing an output control signal on either the rising or the falling current signal having a signal level above selected signal levels in conjunction with means for gating the output control signals to prevent occurrence of an output control signal due to a rising current signal on initial rising of current in the electric circuit to bring the electric circuit to normal operating condition.

In electric circuits it is often desirable to detect variations in the electrical parameters thereof which occur due to undesirable conditions in the circuits. Thus for example, in electro-chemical machining circuits and the like it is desirable to detect rising and falling current in the machining circuits since such current changes may indicate impending circuit difficulties, such as sparks or shorts between the tool and workpiece. In the electrochemical machining circuits it is desired to cut the power supply off in response to an increase or decrease in current having selected signal levels since the workpiece or tool may be seriously damaged if sparks or shorts are present in the machining circuit across the gap between the tool and workpiece.

With such apparatus it is not however desirable to cut off the power supply and stop the machining due to normal disturbances such as ripple from the power supply keying pulses, noise and the like, since cutting off the power supply of electro-chemical machining apparatus when it is not necessary to protect the workpiece or tool is expensive in terms of dollars lost due to down time of the machine. In addition, in electro-chemical machining operations restarting the machining operation without damaging the workpiece or tool is usually not practical.

Further it will be readily understood that in most electric circuits as in electro-chemical machining circuits that the circuits must come to a normal operating condition on starting by building up current in the circuit. It would not of course be desirable to turn off the circuits due to such normal current rise.

It is therefore an object of the present invention to provide improved structure for detecting rise and fall of an electric signal and providing an output control signal in response thereto.

Another object is to provide an electronic control circuit including means for detecting rise and fall of current in an electric circuit, separate means for providing a trigger signal on occurrence of selected rise or fall of the signal level of the detected current and means for providing an output control signal in response to the means for providing a trigger signal.

Another object is to provide structure as set forth above and further including separate means for selecting the signal level to which the separate means for providing the trigger signal are responsive.

Another object is to provide structure as set forth above and further including means for gating the means for providing an output control signal to prevent providing an output control signal in response to a current rise due to initial establishing of normal operating current in the electric circuit.

Another object is to provide structure as set forth above and further including means for adjusting the gate time of the gating means.

Another object is to provide an electronic circuit for compressing a composite electric signal including current rise and fall signals and isolating the current rise and fall signals from ripple, noise and other extraneous signals.

Another object is to provide an improved electronic circuit for providing a trigger signal in response to a rising current signal of selected signal level.

Another object is to provide an improved electronic circuit for providing a trigger signal in response to a falling current signal of selected signal level.

Another object is to provide an improved electronic circuit for providing a gating signal.

Another object is to provide an improved method for providing an output control signal in response to a rising or falling current signal of selected signal level.

Another object is to provide a method for providing an output control signal in response to a rising or falling current signal comprising isolating the rising or falling current signal from extraneous signals associated therewith, separately detecting a rising or falling current signal having a selected signal level providing a trigger signal in response thereto and providing an output control signal in response to the trigger signal.

Another object is to provide a method as set forth above and further including gating the output control signal to suppress output control signals during initial current signal rise.

Another object is to provide an improved electronic circuit for and method of providing an output control signal in response to a rising or a falling current signal which has high sensitivity and stability and which is simple, economical and efficient.

Other objects and features of the invention will become apparent as the description proceeds, especially when taken in conjunction with the accompanying drawings, illustrating a preferred embodiment of the invention, wherein:

FIG. 2 is a schematic diagram of the electronic circuit illustrated in FIG. 1.

Figure 1:
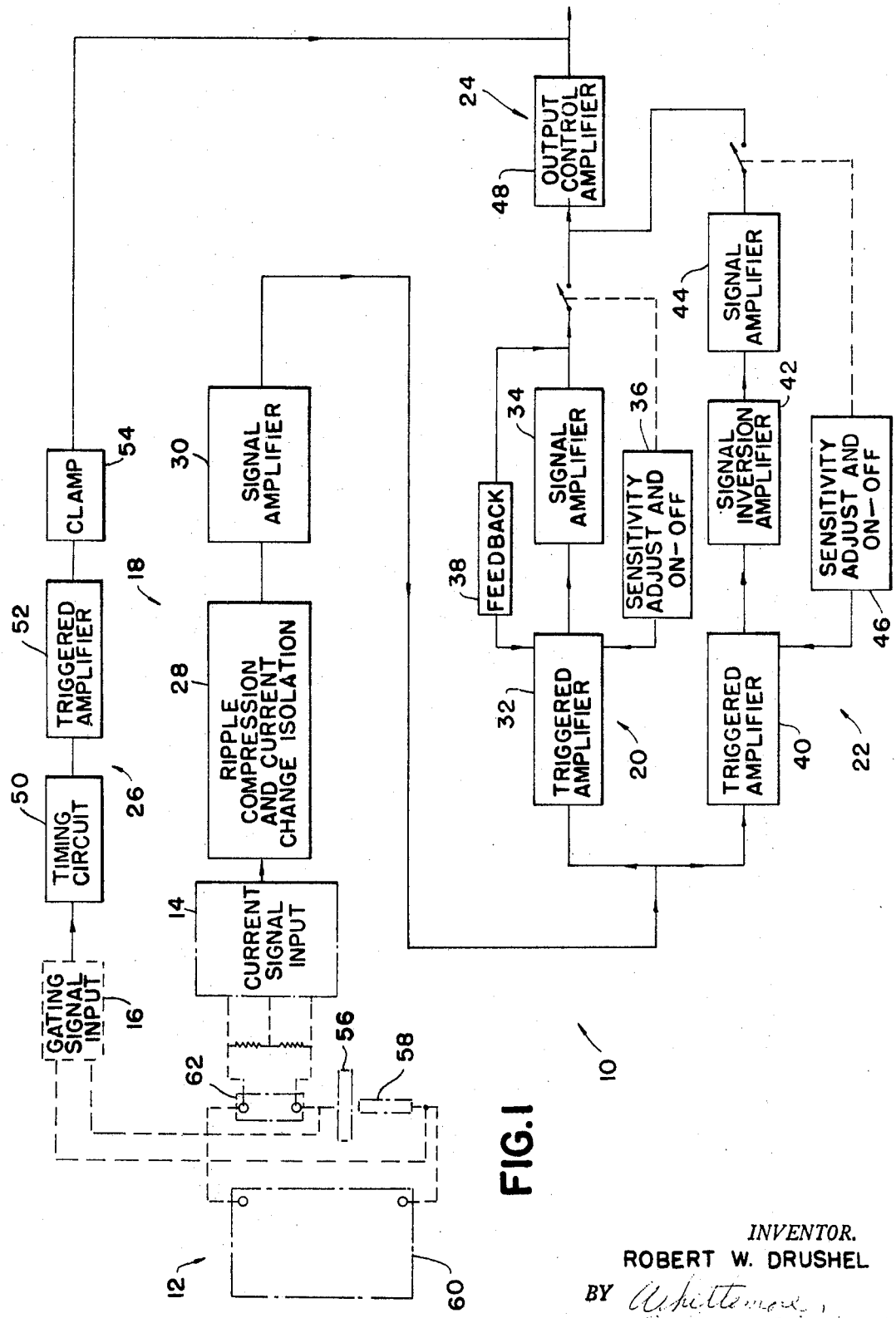
FIG. 1 is a block diagram of an electronic circuit for providing a gated output control signal in response to a rising or falling current signal having a selected signal level constructed in accordance with the invention for performing the method of the invention connected to electro-chemical machining apparatus by input signal developing circuitry.

With particular reference to the figures of the drawings, one embodiment of the present invention will now be considered in detail.

The electronic control circuit 10 is shown in FIG. 1 in conjunction with electro-chemical machining structure 12 and circuits 14 and 16 fore providing input signals from the electro-chemical machining structure to the control circuit 10. Control circuit 10 includes the signal detecting circuit 18 connected to provide input signals to the positive signal channel 20 and the negative signal channel 22 both of which feed the single output control circuit 24. Gating circuit 26 completes the control circuit 10.

As shown in FIG. 1 the signal detecting circuit 18 includes a ripple compression and current change isolation circuit 28 connected to a signal amplifier 30. The function of this circuit is to receive an input signal from the current signal input circuit 14 containing current change signals mixed with ripple, noise and other extraneous undesired signals and to provide an output signal in which the current change signals are amplified and isolated from the undesired signals.

The positive signal channel circuit 20 includes the triggered amplifier 32, the signal amplifier 34, a sensitivity adjust and on-off circuit 36 and a feedback circuit 38 connected as illustrated in FIG. 1. The function of the positive signal channel 20 is to receive amplified and isolated positive current change signals from the signal detecting circuit 18 and provide a trigger signal output to the output control circuit 24 when a positive current change signal has a selected predetermined signal level.

The negative signal channel circuit 22 includes the triggered amplifier 40, the signal inversion amplifier 42, signal amplifier 44 and the sensitivity adjust and on-off circuit 46. The function of the negative signal channel 22 is to provide a trigger signal output to the output control circuit 24 when a negative current change signal has a selected predetermined signal level.

The output control circuit 24 includes a single amplifier 48. The output control circuit is connected to the positive signal channel 20 and the negative signal channel 22 to provide an output control signal on receipt of a signal from either the positive or negative signal channel providing the output control circuit 24 is permitted to do so by the gating circuit 26.

Gating circuit 26 includes a timing circuit 50, the triggered amplifier 52 and clamp 54. The function of the gating circuit 26 is to receive a signal from the gating signal input circuit 16 indicating turning on of the electro-chemical machining apparatus 12 and provide a blanking signal to the output control circuit 24 to prevent an output control signal from occurring for a selected time to prevent shutting down of the electro-chemical machining apparatus 12 in response to a positive current change signal due to turning on of the electro-chemical machining apparatus 12.

More specifically, the electro-chemical machining apparatus 12 includes a power supply 60 which may be for example a 0 to 20 volt, 10,000 ampere direct current source connected across the 0 to 50 millivolt shunt 62 in series with the workpiece 56 and the tool 58. The electro-chemical machining apparatus 12 further includes some means such as a tank, not shown, in which the workpiece 56 is supported and by which an electrolyte may be maintained between the electrode tool 58 and the workpiece 56 and some means also not shown for moving the electrode tool 58 relative to the workpiece 56 so as to maintain a predetermined machining gap therebetween in which the dielectric is maintained.

Such electro-chemical machining apparatus is well known both in structure and operation and will not therefore be considered further in detail herein except to note that the operating parameters thereof may be varied greatly. Only designer's skill would be necessary to vary the parameters of the control circuit 10 and the parameters of the circuits 14 and 16 to accommodate any particular parameters of the electro-chemical machining apparatus 12. That is to say for example the power supply 60 need not be limited to a 0 to 20 volt power supply operating at 10,000 amperes and the shunt 62 need not be a 0 to 50 millivolt shunt.

The current signal input circuit 14 and the gating signal input circuit 16 may be provided by the ordinary electrical designer and will not be considered in detail herein since the specific structure for providing input signals to and controlled by the control circuit 10 is not part of the present invention. The signal input circuit may be the differential amplifier and associated circuits as set forth in the commonly owned copending Drushel patent application Ser. No. 573,999, filed Aug. 22, 1966 and functions to provide an output signal which is representative of current increases and current decreases in the electrical machining circuit of the electro-chemical machining apparatus 12, as sensed across the shunt 62 together with extraneous signals such as keying signals from the power supply 60 and noise signals, for feeding to the signal detecting circuit 18. The gating signal input circuit functions to provide an output signal to the gating circuit 26 only in response to the starting up of the electrochemical machining apparatus 12.

As shown best in FIG. 2 the ripple compression and current change isolation circuit 28 includes first and second transistors 64 and 66 connected in modified emitter follower configuration to the common emitter resistor 68 and to a source of 24 volt positive electrical energy through separate collector resistors 71 and 72 respectively. A Zener diode 74 is connected between the emitter resistor 68 and the emitter of the transistor 64 as shown best in FIG. 2 to maintain the desired operating level of the transistor 64. The input circuit to the transistor 64 is across a resistor 76 and through a current limiting resistor 78. As shown in FIG. 2 one end of the resistor 76 is connected to electronic common 70. In the case of the transistor 66 the input signal to the base of the transistor is across a resistor 80 which is connected to electronic common 70.

In addition the input signal to the transistor 64 is across a short time constant resistance capacitance circuit including the resistance 82 and the capacitance 84. Resistance 82 may for example be a 1000 ohm resistor with the capacitor 84 being a 1 microfarad capacitor. The input to the base of the transistor 66 is through a much larger time constant including the resistor 82, resistor 86 and capacitor 88. The resistor 86 may for example be a 1000 ohm resistor while the capacitor 88 may be a 5 microfarad capacitor so that the time constant of the input circuit of the transistor 66 is approximately ten times that of the input circuit of the transistor 64. Further the diode 90 is positioned in the input circuit of the transistor 66 to help maintain the charge on the capacitor 88.

In operation the input to the ripple compression and current change isolation circuit 28 over the resistor 82 from the current signal input circuit 14 may be almost any level and may be comprised of noise pulses, sinusoidal waves and ripples of almost any description. As a result of the different time constants in the input circuit of the two transistors 64 and 66 connected as shown as modified emitter followers and the blocking diode effect of the diode 90, the output across the resistor 68 of the ripple compression and current change isolation circuit 28 will be the input signal with the interferring or unwanted portions of the signal stripped or compressed therefrom. The desired current change signals are isolated without loss of the inherent character of the current change signals and without any introduction of significant time delay or reduction of response or fidelity of the current change input signal relative to the current change output signal.

The action of the ripple compression and current change isolation circuit 28 is similar to the compressing of disturbances on a body of water while still sensing the level of the body of water. Thus, the ripple, noise and extraneous electric signals are filtered from the input signal in the circuit 28 by the transistors connected as shown and having input time constants related, as indicated above, trying to draw current through the resistor 68 at different times in response to the extraneous signals both of which transistors are responsive to the current increase and decrease signals.

The signal from the ripple compression and current change isolation circuit 28 is fed to the signal amplifier 30 through the capacitor 92 and the current limiting resistor 94 to the base of a transistor 96. The collector of the transistor 96 of amplifier 30 is connected to the positive 24 volt electric energy source through the resistor 98 in series with the resistor 100 which is in parallel with capacitor 110. The emitter of the transistor 96 is connected to electronic common through the resistor 102 and the series diodes 104 and 106. A negative 20 volt electric energy source is connected to the junction between the diode 104 and resistor 102 through the resistance 108 as shown to provide a predetermined bias on the transistor 96. Amplifier 96 further includes the resistor 112 connected between electronic common and the junction between the coupling capacitor 92 and the current limiting resistor 94.

In operation the amplifier 30 receives the isolated current change signals from the circuit 28 and amplifies the signal substantially unchanged and presents it to the positive signal channel 20 and negative signal channel 22 about a 12 volt pivot voltage on the collector of the transistor 96 established by the bias applied to the emitter of the transisor 96 over the diodes 104 and 106 from the negative 20 volt electric energy source.

Without a current change signal from the ripple compression and current change isolation circuit 28 the voltage at the collector of the transistor 96 is substantially constant and since the coupling between the amplifier 30 and the positive signal channel 20 and the negative signal channel 22 is across capacitors 114 and 116 respectively no signal will be transferred to the positive signal channel 20 or the negative signal channel 22 and no output control signal will be provided from the output control circuit 24.

As shown best in FIG. 1 the positive signal channel 20 and the negative signal channel 22 are connected in parallel between the signal detecting circuit 18 and the output control circuit 24. The positive signal channel 20 will be considered first followed by a consideration of the negative signal channel 22.

The triggered amplifier 32 of the positive signal channel 20 includes the positive base transistor 118 having a collector connected to a positive 24 volt electrical energy source through the resistance 120. The emitter of the transistor 118 is connected to receive a bias voltage from the sensitivity adjust and on-off circuit 36 which will be considered subsequently. The input to the base of the transistor 118 of amplifier 32 is through the capacitor 114, diode 121 and resistor 122 connected in series and across the resistor 124 connected between the capacitor 114 and diode 121 at one end and electronic common at the other end and resistor 123 connected between diode 121 and resistor 122 at one end and electronic common at the other end. The base circuit of the transistor 118 further includes the diode 126 and capacitor 128 connected as shown in FIG. 2.

In operation the transistor 118 is normally biased to be turned off so that the collector is at a voltage very close to the 24 volt positive electrical energy source through the resistor 120. On receipt of a positive current change signal from signal amplifier 30 across capacitor 114 having a signal level above that selected by the setting of the sensitivity adjust and on-off circuit 3 the transistor 118 will be turned on whereby the voltage on the collector will be a substantially less positive signal. Thus a negative going signal is provided to the signal amplifier 34 from the triggered amplifier 32.

Negative going current change signals are prevented from turning the transistor 118 on due to the isolating diode 121 and the fact that the transistor 118 is a positive base transistor. Thus only positive going current change signals from amplifier 30 will provide a trigger signal output from the positive signal channel 20.

Signal amplifier 34 includes the transistor 130 the collector of which is connected through switch 132, and resistor 134 to the output control amplifier 48. The collector of the transistor 130 is further connected through the resistor 138 to electronic common. The transistor 130 is biased in a normally off condition by means of the Zener diode 140 and resistor 142 connected between electronic common and the positive 24 volt source of electrical energy as shown in FIG. 2. A current limiting resistor 144 is illustrated in the base circuit of the transistor 130 from the collector of the transistor 118.

In operation on receipt of a negative going signal from the collector of the transistor 118 the normally off transistor 130 is turned on to provide a positive going signal on the collector thereof to drive the output control circuit 24. Due to the positive bias on the transistor 130 which may be for example approximately 22 volts on the emitter of the transistor 130, the signal from the transistor 118 need not proceed far in a negative direction from the approximately 24 volt positive potential applied on the collector thereof with transistor 118 in the off condition to provide a bias on the transistor 130 to turn transistor 130 on. Thus the switching of the transistor 130 is very rapid and a large trigger signal may be provided due to a relatively small signal change on the collector of the transistor 118.

A portion of the output signal on the collector of the transistor 130 of amplifier 34 is fed back through the feedback circuit 38 to the base of the transistor 118 of triggered amplifier 32 to drive the amplifier 118. The feedback circuit 38 includes the resistor 146, diode 148 and capacitor 150 in series between the collector of the transistor 130 and the base of the transistor 118 of amplifiers 34 and 32. The parallel combination of resistor 152 and diode 154 one end of which is connected between the diode 148 and capacitor 150 and the other end of which is connected to electronic common completes the feedback circuit 38.

In operation the feedback circuit 38 helps drive the transistor 118 to insure a signal thereto of sufficient duration to provide an output pulse from the control circuit 10 on receipt of a positive going signal having the selected signal level.

The sensitivity adjust and on-off circuit 36 includes the resistor 156, variable resistor 158 and diode 160 connected in series between the positive source of electrical energy at 24 volts and electronic common as shown. The Zener diode 162 maintains a fixed signal across the resistor 158 and diode 160 to provide a stable sensitivity adjust circuit. The bias placed on the transistor 118 then depends on the position selected for the wiper arm 164 of the variable resistor 158. The wiper arm 164 is positioned to select the signal level the positive going current change signal from amplifier 30 must attain before an output signal is provided from the control circuit 10 as a result of a signal passing from the positive signal channel 20 to the output control circuit 24.

Minor current changes which are insufficient to damage the workpiece or tool in the operation of the electro chemical machining apparatus 12 may be permitted by setting the sensitivity adjust and on-off circuit 36. However, if the setting of the circuit 36 is so low that the sensitivity of the positive signal channel offers no protection to the tool and workpiece the switch 132 which is mechanically connected with the wiper arm 164 is automatically opened to prevent a trigger signal output from the signal amplifier 34 passing to the output control circuit 24.

A similar sensitivity adjust and on-off circuit 46 is provided in the negative signal channel 22. As shown best in FIG. 2, the sensitivity adjust and on-off circuit 46 includes the resistor 168, variable resistor 170 and diode 172 connected in series between the negative 20 volt electrical energy source and electronic common to provide bias for the triggered amplifier 40 across the Zener diode 174 in accordance with the setting of the variable wiper arm 176. Again the position of the wiper arm 176 determines the negative current change signal level at which an output signal is provided from the control circuit 10 and determines when the switch 178 is open to provide no signal output from the negative signal channel 22 due to the setting of the wiper arm 176 below a predetermined sensitivity level.

Triggered amplifier 40 includes the negative base transistor 178 the collector of which is connected to the negative 20 volt electrical energy source through resistor 180 and the emitter of which is connected to the wiper arm 176 of the variable resistor 170 of the sensitivity adjust and on-off circuit 46, as shown in FIG. 2. The input circuit to the base of the transistor 178 from the capacitor 116 includes in series the diode 182, the choke coil 184, diode 186 and current limiting resistor 188. The input circuit to the base of the transistor 178 further includes the resistor 190 connected between the capacitor 116 and diode 182 at one end and to electronic common at the other end, capacitor 192 connected between the coil 184 and diode 186 at one end and electronic common at the other end and the parallel combination of diode 194 and resistor 196 connected at one end between the diode 186 and resistor 188 and at the other end to electronic common as shown.

The additional filter elements and connecting diodes in the negative input signal channel 22 are necessary due to the generally worse condition of a negative going current change signal as compared to a positive going current change signal. The filter system of the input to the transistor 178 of the triggered amplifier 40 however has a function similar to that of the filter system at the input of the transistor 118 in the triggered amplifier 32, that is it discriminates against positive going current change signals and extraneous signals and permits the isolated negative going current change signals to reach the base of the transistor 178 to drive the transistor 178 with as large a signal and as low a time delay as practical.

In operation the transistor 178 is turned off with no negative going current change signal above the selected sensitivity level coming from the signal amplifier 30. In such condition the collector of the transistor 178 is held at a relatively high negative potential. On driving of the transistor 178 into the on condition a positive going signal will appear on the collector of transistor 178.

The signal inversion amplifier 42 receives the positive going output signal from the transistor 178 on its base through the current limiting resistor 198 over the capacitor 200. The signal inversion amplifier 42 further includes the normally off transistor 202 having emitter bias determined by the Zener diode 204 connected between the negative 20 volt electrical energy source and electronic common in series with the resistor 206, as shown in FIG. 2. The collector of the transistor 202 is connected to electronic common through the resistor 208.

In operation with no signal input to the transistor 202 the transistor is normally in the off condition. When the positive going signal is received from triggered amplifier 40 the transistor 202 is turned on and the normally low positive voltage on the collector of transistor 202 drops to a negative potential established by the Zener diode 204. The output of the transistor 202 is thus a negative going signal which is fed across the current limiting resistor 210 to the base of the transistor 212 in the signal amplifier 44.

Signal amplifier 44 includes the transistor 212 having a collector connected to the positive 24 volt electrical energy source through the resistor 214 and to the output control circuit 24 through the switch 178 and the current limiting resistor 216. The emitter of the transistor 212 is connected to a negative 20 volt source of electrical energy through resistor 216 and to electronic common through the Zener diode 218. Diode 220 is connected between the base and emitter of the transistor 212 as shown best in FIG. 2.

In operation of the signal amplifier 34 the negative going electric signal from the collector of transistor 202 is applied to the base of the transistor 212 when the transistor 202 is turned on as the result of a negative going current change signal having a signal level higher than the sensitivity level selected by the sensitivity adjust and on-off circuit 46. This negative going signal will turn the normally conducting transistor 212 off. The output to the output control circuit 24 is thus a positive going signal of relatively large magnitude which is particularly stable.

The output control circuit 24 thus receives substantially the same signal in response to a negative going current change signal or a positive going current change signal having the selected signal levels which levels need not be the same. The output control circuit 24 includes the output control amplifier 48 having transistor 222 the emitter of which is connected directly to electronic common. The emitter and base of transistor 222 are connected by the diode 224 while the collector is connected to the negative 20 volt source of electrical energy through the resistor 226 and the base is connected to the negative 20 volt source of electrical energy through resistor 136.

The transistor 222 is normally in an on condition so that the signal on the collector thereof is substantially at electronic common potential. On receipt of a pulse from either the positive signal channel 20 or the negative signal channel 22 the transistor 222 will be turned off whereby a large negative potential will appear on the collector thereof providing the collector of the transistor 222 is not returned to ground through the gating circuit 26.

The signal output from the output control circuit 24 may be used in any convenient manner to control the circuits providing the input signal to the signal detecting circuit 18. In the structure illustrated the output control signal from the amplifier 48 may be used to cut off the machining circuit from thte power supply 60 of the electro chemical machining apparatus 12 and light a light to indicate that a current change signal produced cutting off of the machining circuit. Since apparatus responsive to an output signal such as the signal from the output control amplifier 48 operable to perform the indicated functions is within the skill of the art to provide, and may in fact, in a simple form, comprise relays actuated thereby or, in a more sophisticated form, may comprise an electronic circuit for accomplishing the same functions faster, they will not be considered in detail herein.

As previously pointed out the output signal from the output control amplifier 24 is present only when the collector of the transistor 222 is not connected to electronic common potential. The collector of the transistor 222 is connected to electronic common when the normally off transistor 228 is conducting. The gating circuit 26 is provided to cause the transistor 228 to conduct during starting of the electro-chemical machining apparatus 12 for a selected period of time. Thus current rise signals caused due to starting up of the electro-chemical machining apparatus 12 will not cause the electro-chemical machining apparatus 12 to be shut off by a signal from the output control circuit 24.

The gating circuit 26 receives a signal input to the timing circuit 50 through the gating signal input circuit 16 connected across the gap between the tool 58 and workpiece 56 to sense starting of the electro-chemical machining process. Such circuitry is again within the skill of the art of the usual designer to provide and is not considered in detail herein. The gating signal input circuit may in fact be a switch in series with a source of positive electric energy and the capacitor 232 of the timing circuit 50 whereby the capacitor 232 is charged through diode 230 with the switch closed and means responsive to initiation of current flow across the gap betwen the workpiece 56 and tool 58 to open the switch and keep it open until the apparatus 12 is shut off.

The timing circuit 50 of the gating circuit 26 includes the diode 230 in series with the parallel circuit including the capacitor 232 in parallel with resistor 234 and variable resistor 236 connected in series with each other. The parallel circuit is connected between the current limiting resistor 238 and the diode 230 at one end and electronic common at the other end.

In operation of the timing circuit 50 the positive input signal through diode 230 from gating signal input circuit 16 will charge the capacitor 232 to place a signal on the base of the transistor 240 to maintain the transistor 240 off until the signal on the capacitor 232 is sufficiently drained off through the resistors 234 and 236. The charge on capacitor 232 will not start to drain off until the electro-chemical machining apparatus 12 is turned on. The time constant of the capacitor 232 and resistors 234 and 236 may be changed to provide any time delay reasonably desired and may for example be from about twenty milliseconds to ten seconds by adjustment of the variable position wiper arm 242 on the resistor 236. Thus, in accordance with the adjustment of the timing circuit 50 the transistor 240 which is normally off will not be turned on on starting of the electro-chemical machining apparatus 12 for a predetermined time sufficient for the current across the gap between the electrode 58 and workpiece 56 to reach a proper operating state.

The triggered amplifier 52 besides including the transistor 240 includes the Zener diode 244 connected between the base and emitter of the transistor 240 and the bias circuit connected between the positive 24 volt source of electrical energy and electronic common including the resistor 246 and the Zener diode 248. As shown in FIG. 2 the emitter of the transistor 240 is connected between the resistor 246 and the Zener diode 248. The collector of the transistor 240 is connected through resistance 250 to electronic common and through current limiting resistor 252 to the base of transistor 228.

Thus in operation the transistor 240 will not normally be conducting. In response to the signal from the timing circuit 50 on the base of the transistor 240 draining to a predetermined potential, the transistor 240 will turn on to provide a positive going signal on the base of transistor 228.

The clamp 54 includes the previously indicated transistor 228 the emitter of which is connected directly to electronic common and the collector of which is connected to a negative 20 volt source of electrical energy through the resistor 256. The base of the transistor 228 is connected to the negative 20 volt electrical energy source through the resistor 254. The base of the transistor 228 is further connected to electronic common through the diode 258.

The transistor 228 is normally conducting to maintain the collector at some potential close to electronic common before and during starting of the apparatus 12 whereby the collector of transistor 222 is effectively connected to electronic common to prevent an output signal from the output control circuit 24 shutting off the apparatus 12 at this time. After the initial starting period of the apparatus 12 as determined by the time delay of the timing circuit 50 the collector of transistor 228 is allowed to go substantially 20 volts negative with the transistor 228 turned off due to a signal received at the base thereof from amplifier 240. The positive or negative signal channels are then effective to turn off transistor 222 to provide an output signal from the control circuit 10 on sensing of a selected current rise or fall signal.

In overall operation as the electro-chemical machining apparatus 12 is turned on there will be a current rise between the workpiece 56 and the electrode tool 58 which may be substantial and which is detected by the gating signal input circuit 16. The gating signal input 16 then cuts off the signal charging capacitor 232 of the timing circuit 50. Timing circuit 50 in turn triggers the triggered amplifier 52 which is normally off, on after the selected time delay to allow the apparatus 12 to come to the usual operating state. Turning on of the triggered amplifier 52 will turn the clamp 54 off to release the output control circuit 24 which is clamped to electronic common until the timing circuit 50 has timed out.

After the initial start-up period the operation of the control circuit 10 may be considered without reference to the gating circuit 26. Thus after the initial start-up of apparatus 12 the composite current signal including the positive and the negative current change signals across the workpiece 56 and electrode tool 58 and extraneous noise, ripple and similar signals is passed to the ripple compression and current change isolation circuit 28 of the signal detecting circuit 18. In the circuit 28 the extraneous input signals are suppressed and the current change signals are isolated. These isolated current change signals are amplified by the signal amplifier 30 and are passed to the positive signal channel 20 and negative signal chamber 22.

In the positive signal channel 20 the normally off triggered amplifier is turned on by positive current change signals having a signal level above a signal level selected by the sensitivity adjust and on-off circuit 36. The signal from the triggered amplifier 32 is passed to the signal amplifier 34 to turn the normally off amplifier on and amplify the signal passed thereto. The amplified signal from the signal amplifier 34 is fed back through the feedback circuit 38 to provide a further drive signal for the triggered amplifier 32. The output of the amplifier 34 is thus further amplified and stabilized. The output signal from the positive signal channel 20 is then passed to the output control circuit 24.

On receipt of a negative going current change signal the normally off triggered amplifier 40 of the negative signal channel 22 is turned on providing the signal level of the negative going current change is above that selected by the setting of the sensitivity adjust and on-off circuit 46. The turning on of the triggered amplifier 40 causes the signal inversion amplifier 42 to turn on which will turn off the signal amplifier 44 and produce an output from the negative signal channel 22 which is amplified and stabilized with respect to the input signal thereto from the signal detecting circuit 18 and which is fed to the output control circuit 24.

On receipt of either a signal from the positive signal channel 20 or the negative signal channel 22 indicating a selected level of current change in the circuit of the electro chemical machining apparatus 12 the amplifier 48 of the output control circuit 24 will turn off to produce an output control signal over conductor 260 a few microseconds after a critical current change signal level is sensed by the control circuit 10. The output control signal may in accordance with the invention be used in any manner desired to prevent damage to the workpiece and tool such as for example by shutting down the electro-chemical machining apparatus 12 and lighting a light, not shown, to indicate a current change signal caused the shut down.

While one embodiment of the present invention has been disclosed in detail, it will be understood that other embodiments and modifications are contemplated by the inventor. It is the inention to include all embodiments and modifications as are defined by the appended claims within the scope of the invention.

What I claim as my invention is:

1. An electronic control circuit for providing an output control signal in response to a positive or negative current change signal having a selected magnitude comprising means for compressing a composite electric signal which signal includes current change signals and extraneous signals and isolating the current change signals from the extraneous signals, separate means responsive to the positive and negative current change signals having a selected signal level for providing trigger signals and means for receiving the trigger signals and providing an output control signal in response thereto.

2. Structure as set forth in claim 1 wherein the means for compressing the composite signal and isolating the current change signals from the extraneous signals comprises a pair of transistors connected to a common emitter resistor in modified emitter follower configuration, a Zener diode connected between the emitters of the transistors, a relatively short time constant input circuit to one of the transistors and a relatively long time constant input circuit to the other of the transistors connected to receive the composite electric signal.

3. Structure as set forth in claim 1 wherein the means responsive to positive current change signals includes a normally off triggered amplifier having an input filter circuit for discriminating against negative signals, a sensitivity adjust and on-off circuit connected to the triggered amplifier for selecting the positive current change signal level effective to turn the triggered amplifier on, a normally off signal amplifier connected to the triggered amplifier for receiving the output signal therefrom and producing an amplified and stabilized trigger signal in response thereto and a feedback circuit for feeding back part of the trigger signal to the input of the triggered amplifier.

4. Structure as set forth in claim 1 and further including gating means connected to the means for providing an output control signal for selectively rendering the means for providing an output control signal ineffective to provide an output control signal.

5. An electronic circuit for isolating current change signals from extraneous signals in composite signals comprising a pair of transistors connected in modified emitter follower configuration having a common emitter resistor, a Zener diode connected between the emitters of the transistors, a relatively short time constant input circuit to one of the transistors and a relatively long time constant input circuit to the other of said transistors connected to receive the same composite signals.

6. A positive signal channel circuit for sensing positive going current change signals and for providing an output signal in response to a positive current change signal having a selected signal level comprising a normally off triggered amplifier having an input filter circuit for discriminating against negative signals adapted to be turned on, on receipt of a positive current change signal having a selected signal level, a normally off signal amplifier for receiving and amplifying the output signal of the triggered amplifier, means for feeding back a portion of the output signal of the signal amplifier to the input of the triggered amplifier to provide an amplified and stabilized output from the signal amplifier, and means connected to the triggered amplifier and to the output of the signal amplifier for selecting the signal level input to the triggered amplifier effective to turn the triggered amplifier on and for preventing an output signal from the signal amplifier if the signal level selected is below a minimum signal level.

7. A negative signal channel circuit for sensing negative going current signals and providing an output signal in response thereto comprising a normally off triggered amplifier having an input filter circuit for discriminating against positive signals adapted to be turned on, on receipt of a negative current change signal having a selected signal level, a normally off signal inversion amplifier connected to the triggered amplifier for receiving the output signal therefrom and providing an output signal in response thereto which is amplified and inverted in polarity, a normally on signal amplifier connected to the signal inversion amplifier which is adapted to be turned off on receipt of a signal from the signal inversion amplifier to provide an output signal and sensitivity adjust on-off means connected to the triggered amplifier and the signal amplifier for selecting the signal level at which the triggered amplifier is turned on and for preventing an output from the signal amplifier when the signal level selected is below a predetermined signal level.

8. The method of providing an output control signal in response to current change signals comprising compressing a composite electric signal and isolating the current change signals from extraneous signals associated therewith in the composite electric signal, separately sensing positive current signal changes and negative current signal changes having selected minimum signal levels and providing an output control signal in response to sensing of either a positive current change signal or a negative current change signal above the selected signal levels providing the selecting signal levels are above a minimum selected signal level.

9. The method as set forth in claim 8 and further including suppressing the output control signal for an initial selected period.

10. An electronic control circuit for providing an output control signal in response to a positive or negative current change signal having a selected magnitude comprising means for compressing a composite electric signal which signal includes current change signals and extraneous signals and isolating the current change signals from the extraneous signals, separate means responsive to the positive and negative current change signals having a selected signal level for providing trigger signals wherein the means responsive to negative current change signals includes a normally off triggered amplifier having an input filter circuit for discriminating against positive signals, a sensitivity adjust and on-off circuit connected to the triggered amplifier for selecting the negative current change signal level effective to turn the triggered amplifier on, a normally off signal inversion amplifier for receiving the output signal from the triggered amplifier and inverting the signal and a normally on signal amplifier connected to receive the output signal of the signal inversion amplifier and to provide a trigger output signal from the negative signal channel in response thereto and means for receiving the trigger signals and providing an output control signal in response thereto.

11. Structure as set forth in claim 1 wherein the means responsive to positive current change signals includes a normally off triggered amplifier having an input filter circuit for discriminating against negative signals, a sensitivity adjust and on-off circuit connected to the triggered amplifier for selecting the positive current change signal level effective to turn the triggered amplifier on, a normally off signal amplifier connected to the triggered amplifier for receiving the output signal therefrom and producing an amplified and stabilized trigger signal in response thereto and a feedback circuit for feeding back part of the trigger signal to the input of the triggered amplifier.

References Cited

UNITED STATES PATENTS

| 3,168,708 | 2/1965 | Stuart-Williams et al. | 330—30 |
| 3,173,023 | 3/1965 | Talsoe | 307—255 |
| 3,187,202 | 6/1965 | Case | 307—233 |
| 3,267,293 | 8/1966 | Hinds | 307—236 |
| 3,364,391 | 1/1968 | Jensen | 307—255 |

JOHN S. HEYMAN, Primary Examiner

B. P. DAVIS, Assistant Examiner

U.S. Cl. X.R.

307—233, 236, 255